United States Patent Office 3,467,533
Patented Sept. 16, 1969

3,467,533
PRODUCT FOR PROTECTING AGAINST AND
INHIBITING CORROSION
Henri Brunel, 9 Rue du General Niox,
Paris 16, France
No Drawing. Continuation-in-part of application Ser. No. 157,311, Dec. 4, 1961. This application Sept. 27, 1965, Ser. No. 490,680
Int. Cl. C09d 5/08
U.S. Cl. 106—14                    10 Claims

ABSTRACT OF THE DISCLOSURE

The invention relates to a composition or product adapted to be applied as a coating to metal surfaces to impart corrosion resistant properties thereto and which contains, as its essential ingredient, the reaction product of an alkali nitrite and an abietic resin.

---

The present invention relates to a composition or product for protecting against and inhibiting corrosion and to composition which include such product.

This application is a continuation-in-part of my U.S. application Ser. No. 157,311 filed Dec. 4, 1961 now abandoned.

Among the objects of the invention is to provide an especially effective product which acts as a corrosion inhibitor.

Among other objects of the invention is to provide a corrosion inhibitor which is adapted to be incorporated into various compositions (especially coating and lubricating compositions) and of acting as a corrosion inhibitor when the composition is applied to a metal surface.

Among other objects of the invention is to provide a composition having corrosion inhibiting properties wherein the corrosion inhibitor product is formed, in situ, within the composition.

Another object of the invention is to provide emulsifying agents for mineral oils, and emulsifiable oils for metal tooling possessed with high anticorrosive properties especially with regard to ferrous metals.

Among other objects of the invention is to provide a product which is highly adherent to metal surfaces when applied in the form of an emulsion or a solution and which protects said metal surface against corrosion.

The basic corrosion-inhibitor product of the invention is obtained by reacting sodium nitrite with abietic resin in the presence of a solvent for the sodium nitrite and/or the abietic resin. When an abietic resin is mixed with an aqueous solution of sodium nitrite and the mixture is gently warmed, an exothermic reaction takes place which must not be permitted to increase the temperature beyond about 60° C. If the temperature increases above about 60° C., nitrogen oxides are given off. The reaction is characterized by a green coloration which appears when said reaction starts and develops. This green coloration progressively turns to brown as the reaction progresses.

The term "abietic resin" will be understood to include colophony, resin, tall oil, whether raw or refined, etc., and various products which contain a substantial proportion of abietic acid or abietic anhydride.

Aqueous alcohol solutions of the product may be applied per se, to a metal surface and, on evaporation of the alcohol and water, form an adherent film which provides excellent protection against corrosion. Such a coating may be retained on products to be painted or coated as a primary layer.

Coating solutions in the form of varnishes or paints may be obtained directly by reacting an ethyl alcohol solution of abietic resin with an aqueous or aqueous alcohol solution of an alkali metal nitrite by progressively mixing the two solutions while cooling for maintaining the temperature under 60° C.

Although the nitrites are known to be good corrosion inhibitors, they are not soluble in oils, such as lubricating oils for example, and in oil soluble products generally. The reaction product of the present invention, can, however, with the aid of an emulsifying agent, be incorporated into oils, particularly mineral oils.

Where a pH in the alkaline range is most effective in a corrosion inhibitor product, or when the neutralization or saponification of an acid composition, for instance an anionic surface-active composition containing besides sulfonates, fatty, naphthenic, and/or resinic acids, has to be effected, as when preparing emulsifying compositions for mineral oils according to the most current formulations, the abietic resin may be reacted with an aqueous solution of alkali hydroxide and alkali nitrite, while maintaining the temperature below 60° C. to provide an anticorrosive composition in the desired pH range.

The reaction product may be formed, in situ, in an emulsifying agent by first introducing the abietic resin into the composition or by providing an emulsifying solution containing the abietic resin and thereafter adding the alkali nitrite solution or mixture of alkali metal hydroxide and alkali metal nitrite solution to react therewith.

Water insoluble coatings may be obtained by mixing reaction product or solution of the reaction product with hydrophillic compounds such as hydrophillic soaps including the aminoalcohol soaps and alkali sulfonates.

Water insoluble coatings may be obtained by mixing the reaction product or solution of the reaction product with hydrophobic compounds such as the fatty amines, and polyamines or their hydrophobic soaps, fatty amides, fatty amidoalcohols, alkaline earth sulfonates. These additions also improve the elasticity and other mechanical properties of the composition.

The products can also be mixed with paints, varnishes, plastic coatings, etc., to impart corrosion inhibiting or resisting properties to such materials. The solution of the reaction product is soluble in a wide variety of varnish and lacquer solvents as well as resin from the examples.

Nitrites of polyvalent metals, which are insoluble in the product, may be added to compositions for coating as a pulverulent filler capable of increasing the anticorrosive properties of the compositions containing the inhibitor of the invention.

The following examples will further illustrate how the invention may be carried out in practice but the invention is not restricted to these examples. The parts are by weight unless otherwise stated.

EXAMPLE 1

One thousand kilograms of an emulsifying composition for mineral oils containing, besides oil-soluble sodium petroleum sulfonate and mineral oil, 15% of abietic resin or colophony and 15% of fatty acids, are reacted with 230 kilograms of an alkaline solution containing per 100 g.:25 g. of sodium nitrite, 25 g. of potassium hydroxide and 50 g. of water. The reaction is effected prudently, by adding the aqueous alkaline mixture containing the alkali nitrite progressively while agitating and maintaining the temperature below 55° C.

When the resultant composition is dissolved in mineral oil in the proportion of 16–20% of the emulsifier to 80–84% of oil, an anticorrosive mineral oil solution is obtained which, when emulsified in water in a proportion down to 3% of the oil in water, gives a white, fine and stable emulsion utilizable as a lubricant for steel parts, especially useful in metal tooling, without risk of corrosion. Applying the mineral oil solution directly to the metal surface instead of the aqueous emulsion provides corrosion protection for over 3 months under shelter and cleaning can be effected by simply washing with water.

It is emphasized that only the reaction between alkali metal nitrites and abietic resin permits the introduction of such a high proportion of said nitrites in an emulsifying composition without any risk of separation of an aqueous layer by "salting out" either with regards to the emulsifying composition itself or to the soluble oils obtained therefrom. This is due to the surface-active properties and to the solubility in oil soluble compositions of the compound resulting from the reaction between alkali-metal nitrites and abietic resin.

EXAMPLE 2

100 kilograms of colophony are dissolved in 100 kilograms of ethyl alcohol. At the same time, 10 kilograms of commercial crystallized sodium nitrite are dissolved in 40 kilograms of an aqueous solution of ethyl alcohol at 50%. Then the two solutions are progressively mixed while maintaining the temperature thereof below 60° C. As soon as the reaction takes place, a green color appears which turns to brown when the reaction is complete. There is finally obtained a brown liquid miscible with additional ethyl alcohol and with diverse solvents such as for instance, alcohols other than ethyl, volatile ketones, and ether, volatile chlorinated hydrocarbon solvents, to provide basic anticorrosive products. When said alcohol solution is applied on parts to be protected, it forms after drying an adherent film on the entire surface to which it is applied. If, after a certain time, it is desired to remove the coating, this may be effected by washing or soakng in a diluted alkaline aqueous solution or by means of a solvent for abietic resin, for instance industrial ethyl alcohol.

EXAMPLE 3

To the composition according to Example 2, there are added 25 to 50 kilograms of calcium sulfonate having a high molecular weight preferably between 400 and 600.

The composition obtained when applied to a metal surface and dried provides a continuous water-insoluble coating on said surface which resists corrosion for several months under shelter even when exposed to atmosphere containing a high degree of humidity, and which presents an increased plasticity and mechanical resistance against deterioration. The composition may also protect against corrosion outdoors during a short time for instance, during transportation not exceeding one or two days.

EXAMPLE 4

To the composition obtained according to Example 2, there are added 25 to 50 kilograms of monoethanolamide of tall oil, or the same amide of a naphthenic acid having a molecular weight between 350 and 500.

With the monoethanolamide of tall oil, the composition obtained has improved plastic properties and resists cracking when formed in the layer on the metal surface.

With the monoethanolamide of napthenic acid, the composition obtained has improved plasticity and also improved adherence. In both cases, the cleaning remains possible with alkaline aqueous solutions or washes.

EXAMPLE 5

To the composition obtained according to Example 2, there are added 25 to 75 kilograms of a fatty amine or of an alkylaminopropylamine in which the alkyl group has from 8 to 18 carbon atoms. The composition obtained may be diluted with dichlorethane, trichlorethylene, perchlorethylene or a similar chlorinated solvent or liquid, volatile ketones and ethers for use as coatings resistant against water. The cleaning of said coatings from the metal surface is effected with appropriate solvents, such as chlorinated solvents or liquid ketones.

EXAMPLE 6

To 330 kilograms of the composition obtained according to Example 2 there are added 220 kilograms of a naphthenate of same alkylaminopropylamines as in Example 5. The composition obtained gains very high adhesive and water-repellent properties.

EXAMPLE 7

In the preparation of compositions according to Example 2, an equal weight of tall oil or naphthenic acid are substituted for part of the colophony in the proportion of 5 to 25%. The compositions obtained have substantially the same properties as the product of Example 2, but the coatings formed are less brittle and present a better resistance to vibration, deformation and variations of temperature.

EXAMPLE 8

To the compositions obtained according to Examples 2 and 7 there are added pigments or fillers in the proportions of 5 to 40% based on the amount of said composition and particularly pulverulent insoluble nitrites or polyvalent metals (most of the nitrites other than the alkali nitries being water insoluble).

The nitrites of polyvalent metals act as anticorrosive fillers increasing both the chemical anticorrosive power and the mechanical resistance of the protective layer.

The resultant composition with 5 to 40% of pigment or filler may be applied as such, or after dilution with a solvent, to a metal surface to provide corrosion protection.

With the addition of 15 to 40% of pigment, the resultant composition may be further mixed and ground with linseed oil or other binding compound for paints in the liquid state in a conventional paint mill to produce a paint having anticorrosive properties.

EXAMPLE 9

In the process of Example 2, there is partly substituted for the ethyl alcolhol an equal proportion of a ketone, chlorinated solvent, light mineral oil, vegetable or animal oils with other volatile solvents, etc. The products obtained are useful for coating against corrosion where an action of water, especially due to condensation is feared during the drying step.

EXAMPLE 10

Papers and cardboards are soaked into liquid products prepared as in Examples 2 to 9, or sprayed with said products, for obtaining after drying, impermeable, anticorrosive sheets for wrapping and packing metal parts and metal tools.

The features and principles underlying the invention described above in connection with specific exemplifications will suggest to those skilled in the art many other modifications thereof. It is accordingly desired that the appended claims shall not be limited to any specific feature or details thereof.

I claim:

1. As a product for inhibiting corrosion, the reaction product of an alkali nitrite with an abietic resin, said reaction product being being obtained at a temperature not exceeding 60° C., and reactants being present in sufficient proportions to develop a green coloration when the reaction starts, said reaction being continued until the green coloration turns to brown.

2. A composition for inhibiting corrosion comprising the reaction product of an alkali nitrite with an abietic resin dissolved in an aqueous-alcohol solvent, said reaction product being obtained at a temperature not exceeding 60° C., and reactants being present in sufficient proportions to develop a green coloration when the reaction starts, said reaction being continued until the green coloration turns to brown.

3. An amulsifying composition comprising an emulsifying agent for oil and the reaction product of an alkali nitrite with an abietic resin, said reaction product being obtained at a temperature not exceeding 60° C., and reactants being present in sufficient proportions to develop a green coloration when the reaction starts, said reaction being continued until the green coloration turns to brown.

4. An anti-corrosive wrapping paper comprising paper impregnated with a solution comprising the reaction product of an alkali nitrite with an abietic resin, said reaction product being obtained at a temperature not exceeding 60° C., and reactants being present in sufficient proportions to develop a green coloration when the reaction starts, said reaction being continued until the green coloration turns to brown.

5. Water insoluble coating compositions for protection of metals against corrosion consisting essentially of a liquid volatile solvent containing the reaction product of an alkali metal nitrite with an abietic resin, said reaction product being obtained at a temperature not exceeding 60° C., said reactants being present in sufficient proportions to develop a green coloration when the reaction starts, said reaction being continued until the green coloration turns to brown, said composition containing, in addition, at least one soluble hydrophobic compound selected from the group consisting of fatty amines, polyamines and their hydrophobic soaps, fatty amides, fatty amidoalcohols, and alkaline earth sulfonates.

6. The process for obtaining anticorrosive emulsifying compositions for preparing anticorrosive soluble oils and anticorrosive aqueous oil emulsions which consists in neutralizing and saponifying below 60° C. a surface-active composition containing an abietic resin with an aqueous solution containing an alkali metal hydroxide and an alkali metal nitrite, said ingredients being present in sufficient proportions to to produce a reaction mix which has a green coloration as the reaction starts, continuing the reaction while maintaining the temperature below 60° C. until the reaction mix acquires a brown coloration whereby the corrosion inhibitor resulting from the reaction between the alkali metal nitrite and the abietic resin is both formed and incorporated in the compositions.

7. The process for obtaining coating compositions for protection against corrosion of corrodible metals which consists in reacting below 60° C. an ethyl alcohol solution of abietic resin with an aqueous alcohol solution of an alkali metal nitrite said ingredients being present in sufficient proportions to produce a reaction mix which has a green coloration as the reaction starts, continuing the reaction while maintaining the temperature below 60° C. until the reaction mix acquires a brown coloration.

8. An anti-corrosive paint for the protection of corrodible metals against corrosion comprising the coating composition as claimed in claim 5, and containing in addition 5 to 40% of insoluble ingredients selected from the group consisting of pigments, fillers and insoluble nitrites.

9. Wrapping materials useful for anti-corrosive wrappings consisting of a sheet of absorbent wrapping material impregnated with the composition of claim 2.

10. Wrapping materials useful for anti-corrosive wrappings consisting of a sheet of absorbent wrapping material impregnated with the composition of claim 5.

References Cited

UNITED STATES PATENTS

| | | |
|---|---|---|
| 1,968,722 | 6/1934 | Stone. |
| 2,309,346 | 1/1943 | Lander et al. _____ 106—238 |
| 3,035,926 | 5/1962 | Larrien _____ 117—134 X |

FOREIGN PATENTS 744,524  2/1956  Great Britain.

JULIUS FROME, Primary Examiner

L. HAYES, Assistant Examiner

U.S. Cl. X.R.

106—14, 218, 237, 238, 241; 117—134, 158; 252—388; 260—105